Aug. 25, 1964     J. DE RONDE     3,146,003

COUPLING UNIT

Filed March 22, 1963

INVENTOR
JOHN DE RONDE
BY
Dick, Zarley & Henderson
ATTORNEYS

United States Patent Office 3,146,003
Patented Aug. 25, 1964

3,146,003
COUPLING UNIT
John De Ronde, Otley, Iowa
Filed Mar. 22, 1963, Ser. No. 272,498
4 Claims. (Cl. 280—515)

This invention relates to a coupling unit and in particular to a pin assembly for connecting one vehicle or the like to another.

Heretofore, the coupling pin would be held in place by a locking element, usually small and very susceptible to damage by vibration and friction in the hitch assembly. When the locking element no longer performed its function, the coupling pin would fall out causing the unwanted separation of the coupled vehicles.

Therefore, it is an object of this invention to provide a coupling unit which has a positive locking means to prevent the accidental separation of the pin from the hitch assembly.

It is a further object of this invention to provide a coupling unit having a pin locking element positioned therein out of contact with the hitch assembly.

It is a further object of this invention to provide a coupling unit having a frame for supporting the pin that in turn secures the frame in mating engagement with the hitch assembly.

A further object of this invention is to provide a coupling unit that may be mounted on a hitch assembly in either of two positions whereby the pin may extend upwardly into the hitch assembly in one position or in another position wherein in the conventional manner the pin extends downwardly into the hitch assembly.

A further object of this invention is to provide a coupling unit having a self-locking pin.

Another object of this invention is to provide a coupling unit which is portable.

Still another object of this invention is to provide a coupling unit which is economical to manufacture, durable in use, and refined in appearance.

These and other objects, and other features and advantages of this invention will become readily apparent upon reference to the following description when taken in conjunction with the accompanying drawings, wherein.

Figure 1:
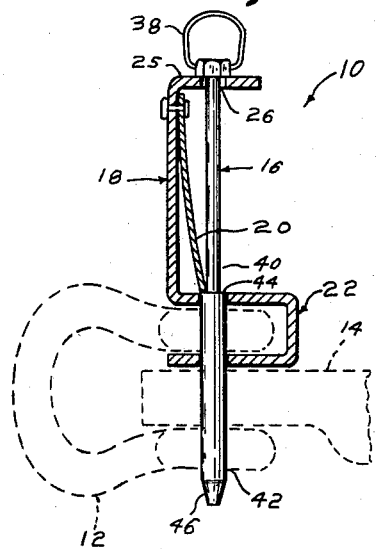
FIG. 1 is a side elevation view of the coupling unit mounted on and connecting together a clevis-drawbar hitch assembly.
Figure 2:
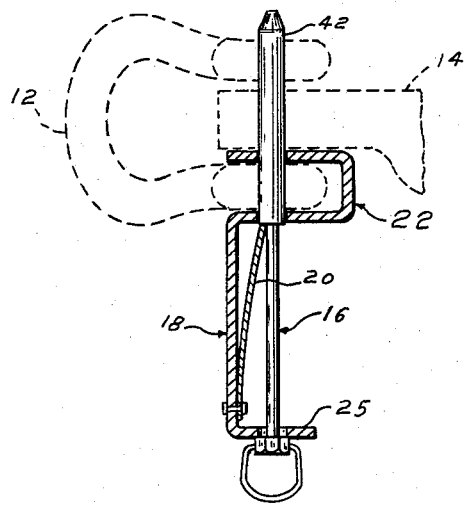
FIG. 2 is similar to FIG. 1 but illustrating the coupling unit mounted on the bottom side of the hitch assembly.

The coupling unit of this invention, generally referred to by the reference numeral 10, is ordinarily used to couple a vehicle or the like having a two-bar hitch to a vehicle having a one-bar hitch. In FIGS. 1 and 2, for example, is a hitch assembly having a clevis 12 coupled to a drawbar 14 of a tractor or the like. Clevis 12 is of conventional construction and includes upper and lower eyelet portions which have the usual apertures, which in turn are normally registering and in alignment with the conventional aperture in the tractor drawbar 14.

The coupling unit 10 comprises generally, a pin 16 supported by a frame 18, which carries a pin locking element 20.

Figure 3:
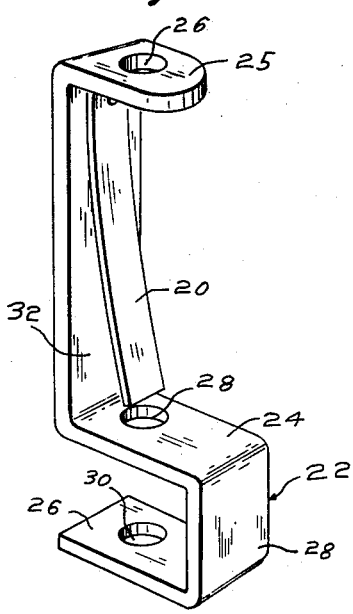
FIG. 3 is a perspective view of the pin support frame.

As illustrated in FIG. 3, the frame 18 is formed from an elongated plate member. At one end of the frame 18 is a channel member 22 having parallel flange elements 24 and 26 extending perpendicularly from a base element 28. Adjacent the ends of the flange elements 24 and 26 opposite the base 28 are formed aligned center openings 28 and 30 respectively. A back member 32 integral with the outer end of channel flange 24 extends perpendicular thereto and away from the channel member 22 terminating in a perpendicular end portion 25, extending in the same direction as flange 24 and parallel thereto. An opening 26 is formed in the end portion 25 and is in alignment with openings 28 and 30 in flanges 24 and 26.

As more clearly seen in FIG. 3, the pin locking element 20 comprises a leaf spring riveted at one end adjacent the end portion 25 to the back member 32 with its other end extending closely adjacent the flange 24. As seen in FIG. 3, the outer edge of the free end of the spring 20 normally extends across the opening 28 in flange 24 at approximately a diametrical line.

Figure 4:
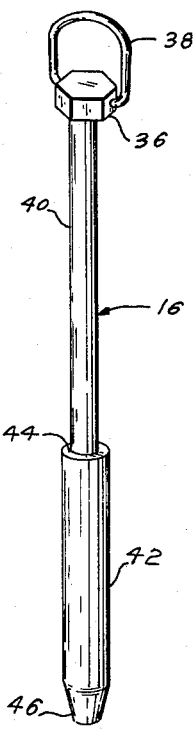
FIG. 4 is a side elevation view of the pin employed in the coupling unit.

The pin element 16 illustrated in FIG. 4 has a head 36 affixed to one end and a ring member 38 carried thereon. Extending from the head 36 is an elongated rod 40 having a length of approximately half that of the pin 16. The rod 40 is connected to a second rod 42 having a relatively larger diameter whereby a shoulder 44 is formed at their junction. The outer end of rod 42 terminates in a uniformity tapered portion 46.

As shown in FIGS. 1 and 2, the pin 16 is assembled in the frame 18 by inserting it into the opening 26 in the end portion 25 and then against the pressure of the leaf spring 20 into the openings 28 and 30 in the flanges 24 and 26 respectively.

In use it is seen in FIGS. 1 and 2 that the coupling unit 10 may be mounted on either side of the drawbar 14 or the like whereby the outer flange 26 of the frame 18 is positioned between one of the clevis elements of clevis 12 (or one of the plates on the end of an implement tongue) and the bar 14. When the pin 16 is positioned in the aligned openings 28 and 30 in the frame flanges 24 and 26 and through the ends of the clevis elements of clevis 12 and the drawbar 14, the leaf spring 20 moves into locking engagement with the shoulder 44 on the pin 16. Thus, it is seen that the frame 18 is secured by one of the elements of the clevis 12, the drawbar 14 and the pin 16 is secured to the frame 18 by the locking leaf spring 20 carried thereon. The fact that the elements of the clevis 12 and the drawbar 14 are separated from the locking spring 20 and its engagement with the shoulder 44 by the frame 18 makes it impossible for the relative movement between the clevis 12 and the drawbar 14 to work the pin 16 out of its locked position. When it is desired to remove the pin 16, all that is required is to move the spring 20 out of engagement with the shoulder 44 and the pin may be pulled out of the hitch assembly and coupling unit 10. Accordingly, with the pin 20 removed, the frame 18 in the coupling unit 10 may be removed from the hitch assembly.

Figure 5:
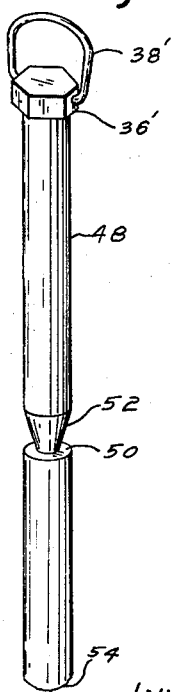
FIG. 5 is a side elevation view of a modified form of the pin illustrated in FIG. 4.

A modified embodiment 16' of the pin 16 (FIG. 4) is illustrated in FIG. 5. It is characterized by its uniform diameter rod 48 in lieu of small and large diameter rods 40 and 42 comprising pin 16. An annular shoulder 50 is formed at the same point as shoulder 44 on pin 20. For a short distance above the shoulder the rod 48 is tapered at 52 and is rounded at its end 54 opposite the head 36'.

Some changes may be made in the construction and arrangement of my coupling unit without departing from the real spirit and purpose of my invention, and it is my intention to cover by my claims, any modified forms of structure or use of mechanical equivalents which may be reasonably included within their scope.

I claim:

1. In combination with a horizontal tractor drawbar means and a horizontally disposed U-shaped clevis mounted thereon, with said clevis including upper and lower eyelet portions adjacent the upper and lower surfaces, respectively, of said drawbar means, said eyelet portions defining apertures in vertical longitudinal alignment with an aperture in said drawbar means, and a latch means, said latch means including horizontal spaced apart flange elements which receive one of the eyelet portions of said clevis therebetween, said flange elements having apertures in alignment with the apertures in said eyelet portions and said drawbar means, said latch means including a back member, a pin extending completely through the registering apertures in said drawbar, said flange elements and both of said eyelet portions of said clevis, and a releasable locking means secured to said back member and releasably engaging said pin to limit its longitudinal movement through said apertures.

2. The combination of claim 1 wherein said pin includes a shoulder, and said releasable locking means releasably engages said shoulder to limit the longitudinal movement of said pin.

3. The combination of claim 1 wherein said pin includes a shoulder, and said releasable locking means releasably engages said shoulder to limit the longitudinal movement of said pin; and said locking means is an elongated leaf spring.

4. The combination of claim 1 wherein said pin includes a shoulder, and said releasable locking means releasably engages said shoulder to limit the longitudinal movement of said pin; and said locking means is an elongated leaf spring; said back member terminating in an end portion, said pin including a head portion, said pin extending through an aperture in said end portion with said head portion of said pin normally engaging said end portion to limit longitudinal movement in one direction of said pin, and said releasable means normally engaging said pin to prevent longitudinal movement thereof in an opposite direction.

References Cited in the file of this patent

UNITED STATES PATENTS

| | | |
|---|---|---|
| 859,979 | Sanker | July 16, 1907 |
| 1,591,152 | Blagoue | July 6, 1926 |
| 2,140,132 | Hollett | Dec. 13, 1938 |